US012657008B2

(12) United States Patent
Radhakrishna et al.

(10) Patent No.: US 12,657,008 B2
(45) Date of Patent: Jun. 16, 2026

(54) AUTOMATED DATA EXTRACTION PIPELINE FOR LARGE LANGUAGE MODEL TRAINING

(71) Applicant: Salesforce, Inc., San Francisco, CA (US)

(72) Inventors: Shruthan Radhakrishna, San Francisco, CA (US); Hadi Minooei, San Francisco, CA (US); Yazdan Jamshidi, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 205 days.

(21) Appl. No.: 18/449,498

(22) Filed: Aug. 14, 2023

(65) Prior Publication Data

US 2025/0060944 A1     Feb. 20, 2025

(51) Int. Cl.
G06F 8/33          (2018.01)
G06F 40/55        (2020.01)

(52) U.S. Cl.
CPC ............... G06F 8/33 (2013.01); G06F 40/55 (2020.01)

(58) Field of Classification Search
CPC ...................................................... G06F 8/33
See application file for complete search history.

(56) References Cited

U.S. PATENT DOCUMENTS

| | | | | |
|---|---|---|---|---|
| 11,954,602 B1 * | 4/2024 | Mulcahy | ............... | G06F 40/284 |
| 12,039,295 B2 * | 7/2024 | Allamanis | ................. | G06F 8/33 |
| 12,141,553 B2 * | 11/2024 | Athiwaratkun | ..... | G06F 11/3684 |
| 12,147,765 B2 * | 11/2024 | Bhardwaj | ............. | G06F 40/284 |
| 12,277,409 B1 * | 4/2025 | Leeman-Munk | ......... | G06F 8/35 |
| 12,360,791 B1 * | 7/2025 | Vadaparty | ................. | G06F 8/31 |

(Continued)

FOREIGN PATENT DOCUMENTS

| | | | | |
|---|---|---|---|---|
| CN | 115795009 A | * | 3/2023 | |
| CN | 116719520 A | * | 9/2023 | |
| CN | 116820429 A | * | 9/2023 | ............... G06F 8/30 |

OTHER PUBLICATIONS

Ross, Steven I., et al. "The programmer's assistant: Conversational interaction with a large language model for software development." Proceedings of the 28th International Conference on Intelligent User Interfaces. 2023.*

(Continued)

*Primary Examiner* — Francisco J Aponte
(74) *Attorney, Agent, or Firm* — Holland & Hart, LLP.

(57)          ABSTRACT

An automated data extraction pipeline for large language model (LLM) training may include extracting a set of code segments from a set of natural language question-answer (Q&A) combinations that each include a provided input, a provided output, and a provided code segment formatted to transform the provided input into the provided output. The data extraction pipeline may then generate a predicted output from a question portion of a first natural language Q&A combination using a first LLM. A first extracted code segment from the extracted set of code segments may then be executed to generate a first actual output of the first extracted code segment. One or more data samples may then be generated for training a second LLM based on a comparison of the first actual output to the predicted output. The second LLM may then be trained using the one or more data samples.

17 Claims, 10 Drawing Sheets

(56) References Cited

U.S. PATENT DOCUMENTS

| | | | | |
|---|---|---|---|---|
| 2019/0018839 A1* | 1/2019 | Ge | ................... | G06F 16/3344 |
| 2020/0249918 A1* | 8/2020 | Svyatkovskiy | ........ | G06N 3/084 |
| 2020/0364408 A1* | 11/2020 | Lao | .......... | G06F 16/00 |
| 2021/0271455 A1* | 9/2021 | Svyatkovskiy | ........... | G06F 8/33 |
| 2022/0139380 A1* | 5/2022 | Meng | ................ | G06N 3/044 |
| | | | | 704/232 |
| 2022/0398071 A1* | 12/2022 | Allamanis | ............. | G06N 3/084 |
| 2023/0418567 A1* | 12/2023 | Athiwaratkun | .......... | G06F 8/33 |
| 2024/0020097 A1* | 1/2024 | Czapiewski | ............. | G06F 8/33 |
| 2024/0020491 A1* | 1/2024 | Chen | ................ | G06F 40/58 |
| 2024/0143296 A1* | 5/2024 | Hasabnis | ................ | G06F 8/41 |
| 2024/0248686 A1* | 7/2024 | Garg | ................. | G06F 11/3668 |
| 2024/0273294 A1* | 8/2024 | Shakeri | ................ | G06F 40/295 |
| 2024/0281218 A1* | 8/2024 | Masad | ..................... | G06F 8/33 |
| 2024/0361996 A1* | 10/2024 | Fu | ........................ | G06F 8/73 |
| 2024/0362209 A1* | 10/2024 | Almaer | ............. | G06F 16/2433 |
| 2025/0094145 A1* | 3/2025 | Weber | ..................... | G06F 8/43 |
| 2025/0094814 A1* | 3/2025 | Wang | ................. | G06N 3/0895 |
| 2025/0103300 A1* | 3/2025 | Le | ......................... | G06F 40/40 |
| 2025/0111220 A1* | 4/2025 | Jones | ....................... | G06N 3/08 |
| 2025/0117195 A1* | 4/2025 | Rieken | ..................... | G06F 8/35 |
| 2025/0123812 A1* | 4/2025 | Zhao | ......................... | G06F 8/30 |

OTHER PUBLICATIONS

CN-116719520-A—English Translation.*

English Translation CN-115795009 A.*

Da Silva, Mauricio Monteiro. "No Code Interface for Building Web Apps with Language Models." (2025).*

Jain, Naman, et al. "Jigsaw: Large language models meet program synthesis." Proceedings of the 44th International Conference on Software Engineering. 2022.*

MacNeil, Stephen, et al. "Experiences from using code explanations generated by large language models in a web software development e-book." Proceedings of the 54th ACM Technical Symposium on Computer Science Education V. 1. 2023.*

Liu, Jiawei, et al. "Is your code generated by chatgpt really correct? rigorous evaluation of large language models for code generation." Advances in Neural Information Processing Systems 36 (2023).*

* cited by examiner 110-a 130-a 110-b 130-b 105-a 105-b 105-c 130-c 110-c 130-d 130-d 110-d Data Center

120

140

Cloud Platform

135

115

125

100

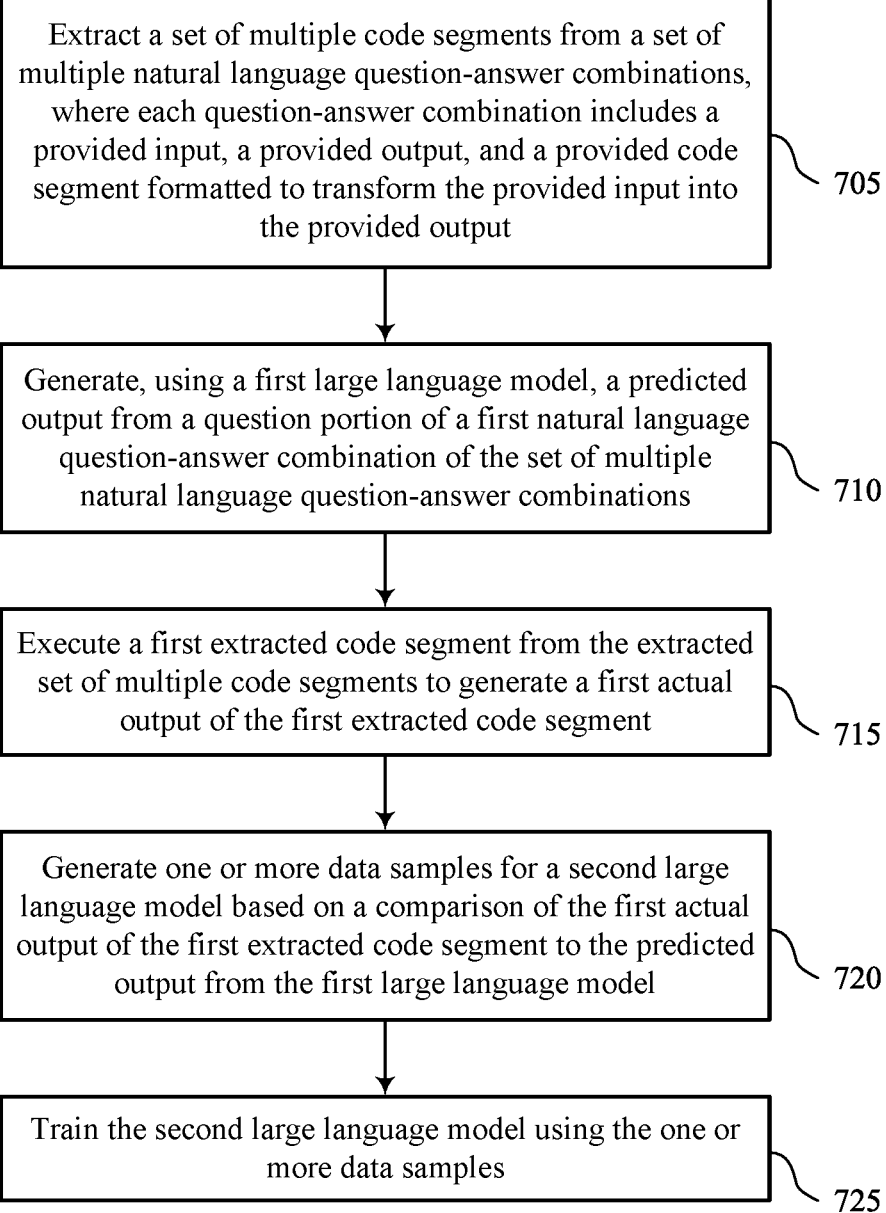

Extract a set of multiple code segments from a set of multiple natural language question-answer combinations, where each question-answer combination includes a provided input, a provided output, and a provided code segment formatted to transform the provided input into the provided output — 705

Generate, using a first large language model, a predicted output from a question portion of a first natural language question-answer combination of the set of multiple natural language question-answer combinations — 710

Execute a first extracted code segment from the extracted set of multiple code segments to generate a first actual output of the first extracted code segment — 715

Generate one or more data samples for a second large language model based on a comparison of the first actual output of the first extracted code segment to the predicted output from the first large language model — 720

Train the second large language model using the one or more data samples — 725

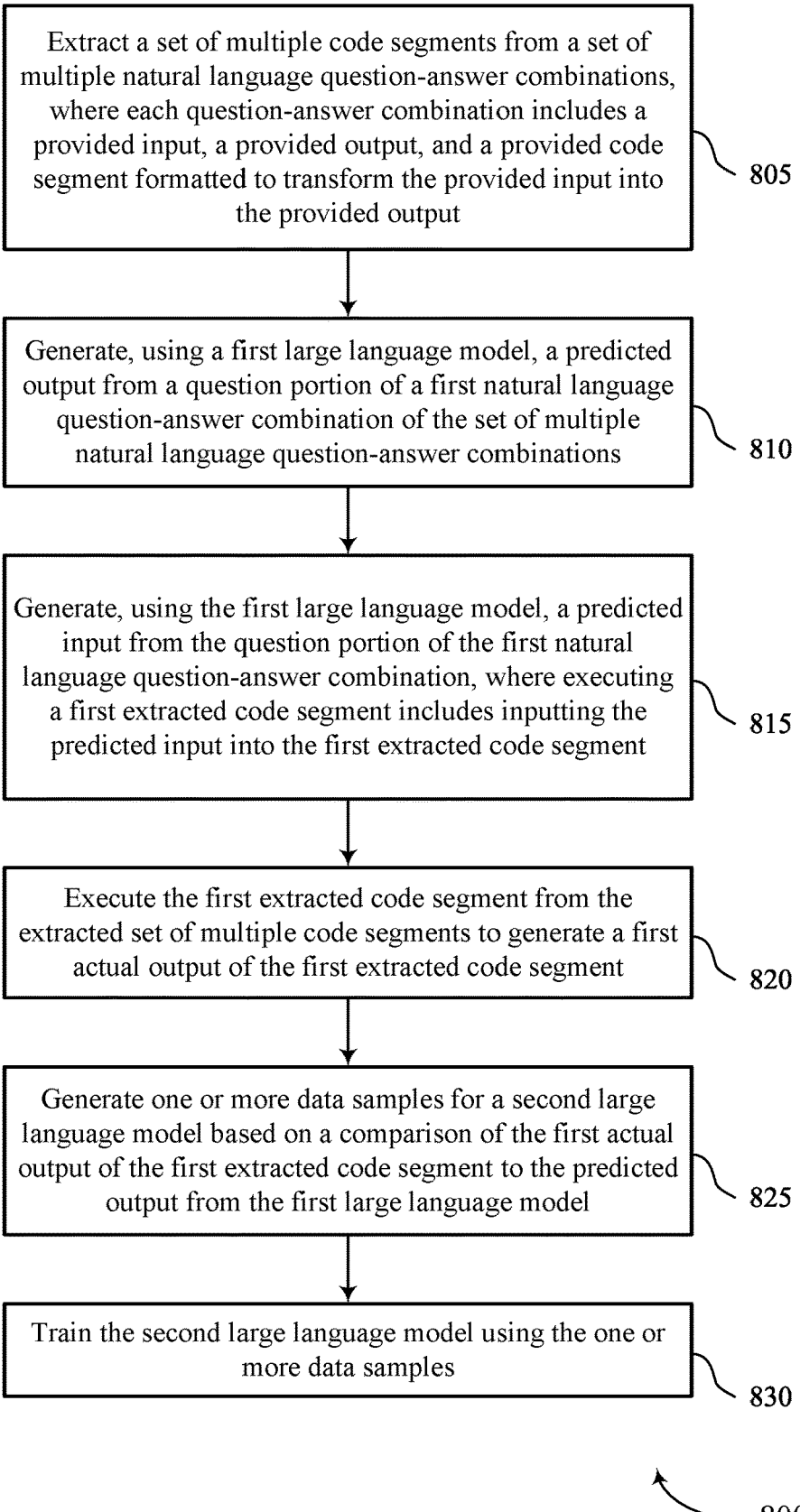

Extract a set of multiple code segments from a set of multiple natural language question-answer combinations, where each question-answer combination includes a provided input, a provided output, and a provided code segment formatted to transform the provided input into the provided output ⟩ 805

Generate, using a first large language model, a predicted output from a question portion of a first natural language question-answer combination of the set of multiple natural language question-answer combinations ⟩ 810

Generate, using the first large language model, a predicted input from the question portion of the first natural language question-answer combination, where executing a first extracted code segment includes inputting the predicted input into the first extracted code segment ⟩ 815

Execute the first extracted code segment from the extracted set of multiple code segments to generate a first actual output of the first extracted code segment ⟩ 820

Generate one or more data samples for a second large language model based on a comparison of the first actual output of the first extracted code segment to the predicted output from the first large language model ⟩ 825

Train the second large language model using the one or more data samples ⟩ 830

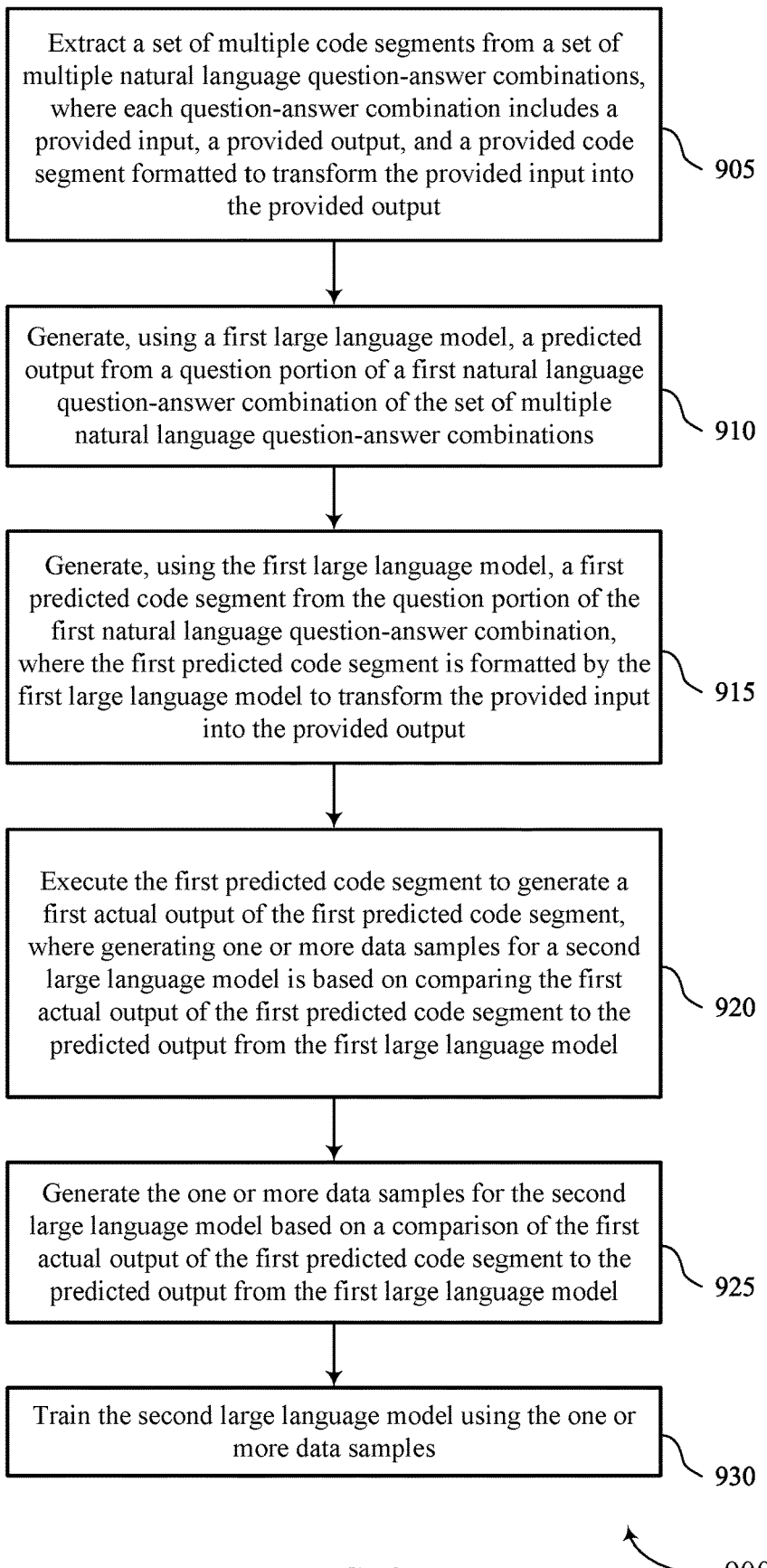

Extract a set of multiple code segments from a set of multiple natural language question-answer combinations, where each question-answer combination includes a provided input, a provided output, and a provided code segment formatted to transform the provided input into the provided output
— 905

Generate, using a first large language model, a predicted output from a question portion of a first natural language question-answer combination of the set of multiple natural language question-answer combinations
— 910

Generate, using the first large language model, a first predicted code segment from the question portion of the first natural language question-answer combination, where the first predicted code segment is formatted by the first large language model to transform the provided input into the provided output
— 915

Execute the first predicted code segment to generate a first actual output of the first predicted code segment, where generating one or more data samples for a second large language model is based on comparing the first actual output of the first predicted code segment to the predicted output from the first large language model
— 920

Generate the one or more data samples for the second large language model based on a comparison of the first actual output of the first predicted code segment to the predicted output from the first large language model
— 925

Train the second large language model using the one or more data samples
— 930

FIG. 9 — 900

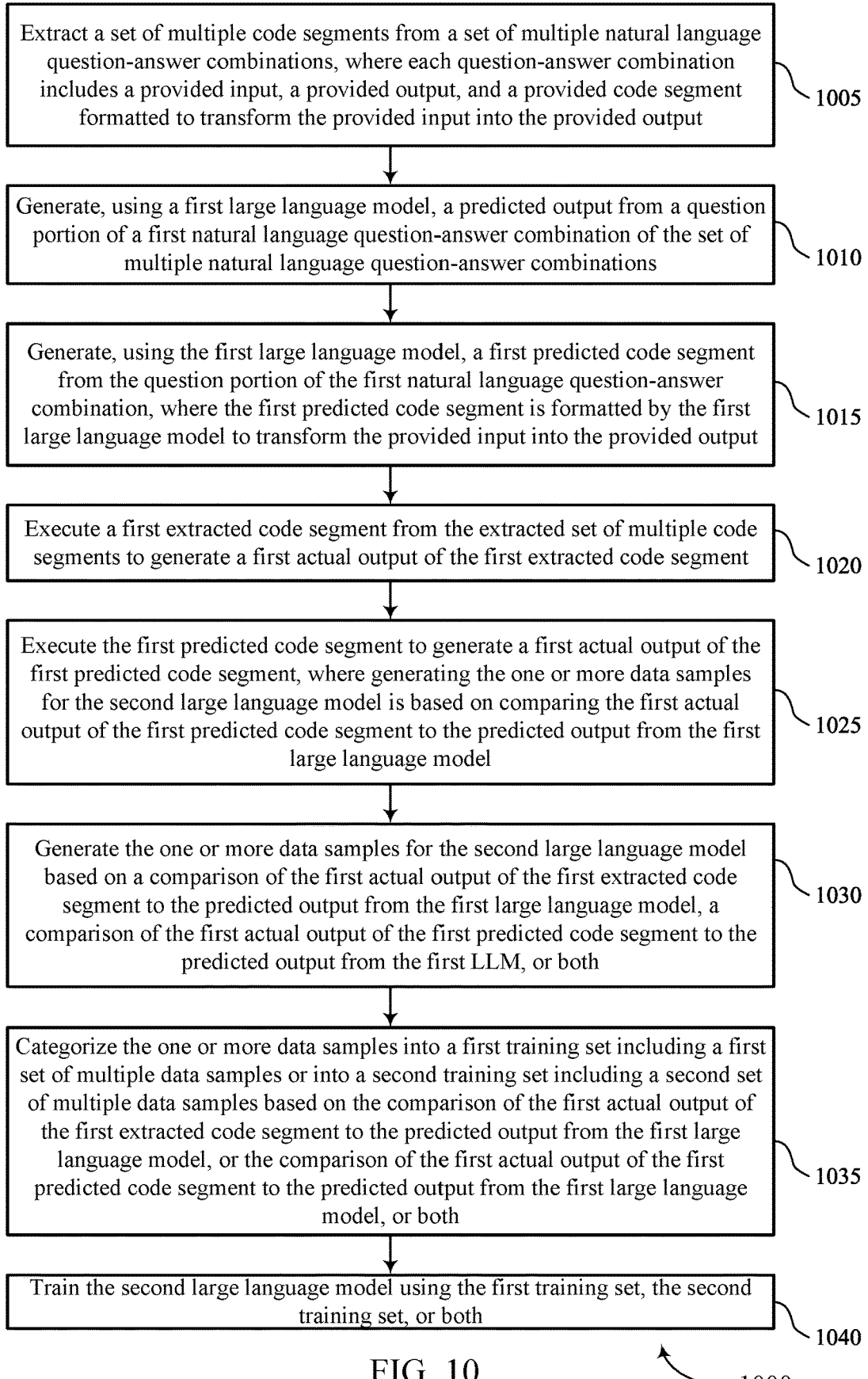

Extract a set of multiple code segments from a set of multiple natural language question-answer combinations, where each question-answer combination includes a provided input, a provided output, and a provided code segment formatted to transform the provided input into the provided output — 1005

Generate, using a first large language model, a predicted output from a question portion of a first natural language question-answer combination of the set of multiple natural language question-answer combinations — 1010

Generate, using the first large language model, a first predicted code segment from the question portion of the first natural language question-answer combination, where the first predicted code segment is formatted by the first large language model to transform the provided input into the provided output — 1015

Execute a first extracted code segment from the extracted set of multiple code segments to generate a first actual output of the first extracted code segment — 1020

Execute the first predicted code segment to generate a first actual output of the first predicted code segment, where generating the one or more data samples for the second large language model is based on comparing the first actual output of the first predicted code segment to the predicted output from the first large language model — 1025

Generate the one or more data samples for the second large language model based on a comparison of the first actual output of the first extracted code segment to the predicted output from the first large language model, a comparison of the first actual output of the first predicted code segment to the predicted output from the first LLM, or both — 1030

Categorize the one or more data samples into a first training set including a first set of multiple data samples or into a second training set including a second set of multiple data samples based on the comparison of the first actual output of the first extracted code segment to the predicted output from the first large language model, or the comparison of the first actual output of the first predicted code segment to the predicted output from the first large language model, or both — 1035

Train the second large language model using the first training set, the second training set, or both — 1040

FIG. 10 — 1000

AUTOMATED DATA EXTRACTION PIPELINE FOR LARGE LANGUAGE MODEL TRAINING

FIELD OF TECHNOLOGY

The present disclosure relates generally to database systems and data processing, and more specifically to automated data extraction pipeline for large language model (LLM) training.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples, users may desire to use a machine learning (ML) model such as a large language model (LLM) or similar generative artificial intelligence model to generate code for a programing language. However, many users may lack the knowledge or technical experience to understand how to describe the problem to the LLM such that the LLM generates a useful output. As such, the LLM may generate relatively low-quality code for the user. Further, some users may use the LLM to generate code for a computer programming language that is a low-resource language. A low-resource language may have relatively less amount of data available to train a ML model compared to a well-known or well-established language. As such, the amount of data points available to train the LLM using traditional LLM training techniques for generating code for a low resource language may be relatively low. Therefore, the reliability and effectiveness of using an LLM to generate code may be relatively low.

BRIEF DESCRIPTION OF THE DRAWINGS

FIGS. 7 through 10 show flowcharts illustrating methods that support automated data extraction pipeline for LLM training in accordance with aspects of the present disclosure.

DETAILED DESCRIPTION

Figure 1:
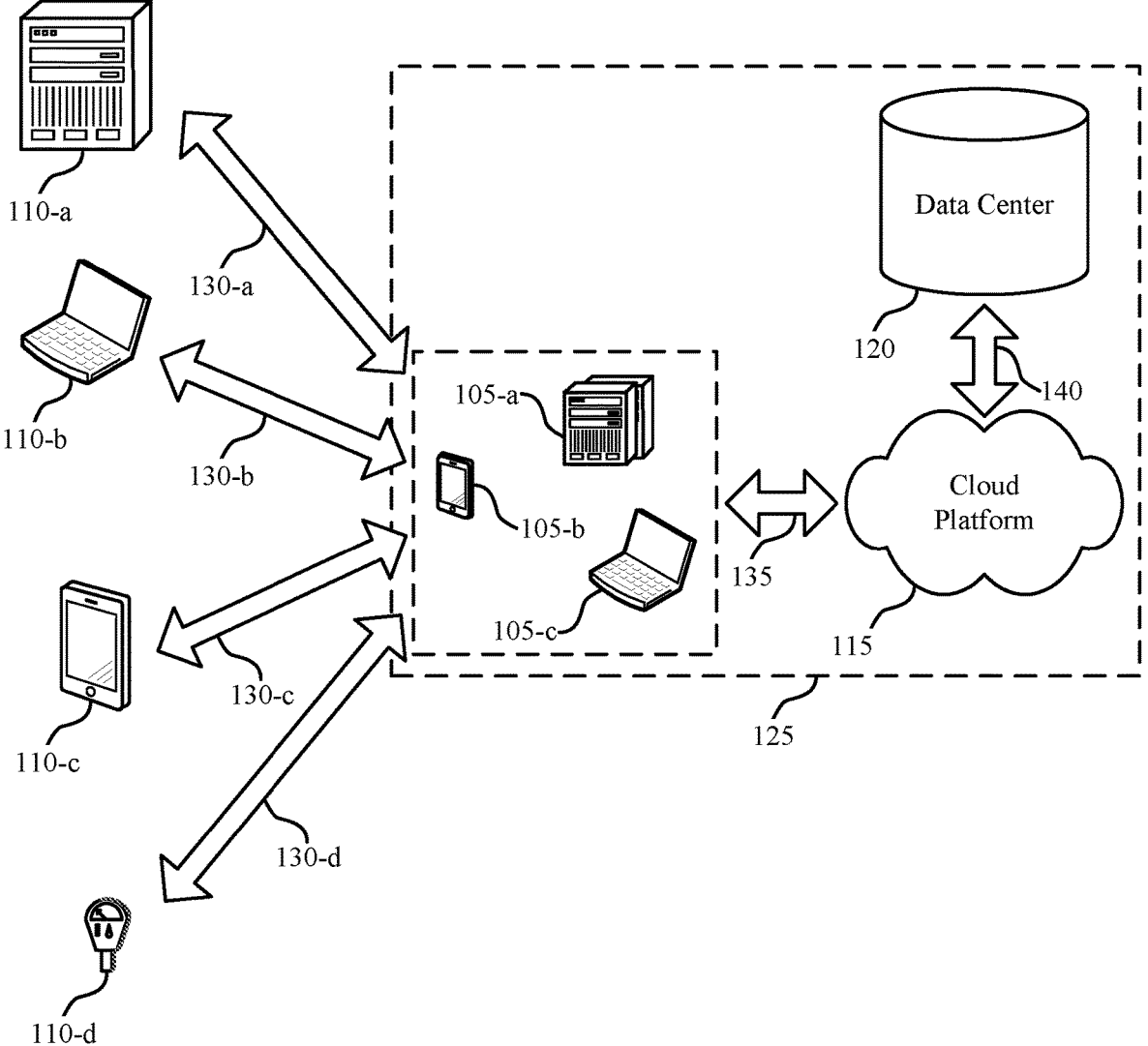
FIG. 1 illustrates an example of a data processing system that supports automated data extraction pipeline for LLM training in accordance with aspects of the present disclosure.

Some machine learning (ML) models may include large language models (LLMs) or similar models capable of generating text, images, computer code, or the like. LLMs may be a type of ML model using an artificial intelligence (AI) system to process a large amount of text data. In some examples, the text data may be given to the LLM as training data (e.g., supervised training) or the AI system of the LLM may perform web-scraping to extract large amounts of data from the internet (e.g., unsupervised training), or a small amount of data may be given to the LLM as training data to instruct what type of data the AI system should extract via web-scraping techniques (e.g., semi-supervised training). The text data may be stored within a database system or unstructured data storage which may then be accessed by the LLM to perform text-based predictions. For example, a LLM may be used by a user to generate code for a computer programming language (e.g., DataWeave, Python, Java, C++) based on a user inputting a problem description. However, many users may lack the knowledge or technical experience to input a problem description for a code segment in such a way that prompts the LLM properly to generate helpful or appropriate output. Additionally, or alternatively, a user may attempt to use an LLM to generate code for a low resource computer programming language (e.g., a language with relatively lower usage rates as compared to more traditional or widely used languages). When attempting to generate code for a low resource programming language, there may be a relatively small amount of data samples or training parameters for the LLM. As such, using the LLM to generate code for a low resource computer program may result in inaccurate output.

The techniques of the present disclosure may describe a data extraction pipeline for training a LLM and may describe simplifying the expected input into the LLM to generate a code segment for a user. In some examples, a LLM training service may extract data from the internet such as from one or more natural language question-answer (Q&A) combinations (e.g., one or more Q&A forum posts) from Q&A forums or help forums. Users may use the Q&A forums to ask other users questions about issues they be encountering when attempting to solve problems. In some cases, each Q&A forum post extracted may include a provided input, a provided output, and a provided code segment which may be formatted to transform the provided input into the provided output. An LLM may then transform the natural language provided input and provided output from a question portion of a Q&A post into a predicted input and predicted output to be used by the LLM training service. Further, the LLM training service may perform web-scraping of such Q&A forums to extract a set of code segments from a set of natural language Q&A combinations or posts using a rule-based extraction program.

In some examples, the LLM training service may execute one of the code segments extracted from the Q&A post by compiling the extracted code segment to generate an actual output of the extracted code segment. Based on comparing the actual output of the extracted code and the predicted output from the question portion of the Q&A post, the LLM training service may generate one or more data samples to train the LLM. As such, the LLM training service may use the one or more data samples to train the LLM that generated the predicted output or to train a different LLM. Such techniques may allow for an LLM to be trained using natural language from Q&A posts and may allow for a more efficient generation of code. For example, when generating code for low resource computer programming language where there may be a low amount of data samples available to train a LLM and extracting data from Q&A forums may provide additional data samples to increase the efficiency of the LLM when generating code.

In some examples, an LLM may generate a predicted input and a predicted output from the question portion of a Q&A post to be used when executing a corresponding extracted code segment for a response portion of the Q&A post. However, in some cases, the Q&A post may not include a code segment. That is, nobody may have answered the question asked by a user in the Q&A post. As such, the LLM may generate a code segment to transform the predicted input into the predicted output and the LLM training service may compare the actual output of the generated code segment to the predicted output to determine whether the generated code segment can be used. Such techniques may enhance how LLMs are used when generating code for users, especially for low resource languages.

Aspects of the disclosure are initially described in the context of an environment supporting an on-demand database service. Additional aspects of the disclosure are described herein with reference to a data extraction system and a flowchart. Aspects of the disclosure are further illustrated by and described with reference to apparatus diagrams, system diagrams, and flowcharts that relate to an automated data extraction pipeline for LLM training.

FIG. 1 illustrates an example of a system 100 for cloud computing that supports an automated data extraction pipeline for LLM training in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120).

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, users of the system 100 (e.g., contacts 110) may use a LLM stored locally or stored within the cloud platform 115 or the data center 130. The users may use the LLM to generate code for a computer programing language. However, many of the users of the system 100 may be unable to provide an effective input into the LLM and as a result the quality of the code generated by the LLM may be relatively low. For example, the LLM may expect to receive a well-structured query outlining the problem to be solved by the code and what the output may look like once the code is executed. Additionally, or alternatively, when the LLM is used to generate code for a low resource computer programming language, even if the query may be structured with the expected inputs and information, the training data of the LLM may be lacking enough data samples to accurately generate code in response to the query.

As such, the system 100 may train the LLM using text data scraped from Q&A forums, help forums, programming language documentation, or any combination thereof. Such forums may include questions about how to solve a problem which may be formatted in a very informal way as if the user may be asking the question to a coworker. For example, the user may ask a question such as "can someone help me with this transformation?" Such question may then be further described with an example input, an expected output, and in some cases, an attempt (e.g., the attempt may be a segment of code) at solving the problem which may be incorrect (e.g., the attempt may be incomplete, the attempt may result in compilation errors, or the attempt may generate an output different from the expected output). In the response to the question other users may outline suggestions on how to solve the problem, explain how to fix the code provided within the post if the code is incorrect, or provide a code segment solving the question asked by the user.

When scraping data from Q&A forums, the system 100 may use natural language processing techniques to identify a question portion that includes an input and an expected output for a problem from a question asked by a user and identify a response portion that includes a code segment formatted to transform the input from the question portion into the expected output from the problem portion. Further, the system 100 may use the NLP techniques to identify and extract the code segment within the response portion of the Q&A post. The system 100 may then compile and execute the extracted code segment and compare the actual output of the extracted to the expected output identified from the question asked by the user in the Q&A forum post. The system 100 may look for an exact match to the expected output as any deviation from the expected output may be indicative of the extracted code being incorrect. However, both correct and incorrect extracted code segments may be used as data samples to train the LLM. As such, a data sample including an input, a code segment, an output may be categorized based on whether the code segment generates the output correctly. The LLM may then be trained using both the correct (e.g., verified) code segments and incorrect (e.g., not verified) code segments which may teach the LLM how to generate correct code segments and how to avoid mistakes presented in the incorrect code segments. As such, using the techniques of the present disclosure, a user may be able to use the LLM to generate code while providing a relatively simple input and based on the data extraction pipeline described with reference to FIGS. 2 and 3, the LLM may be able to effectively generate accurate code segments for the user.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
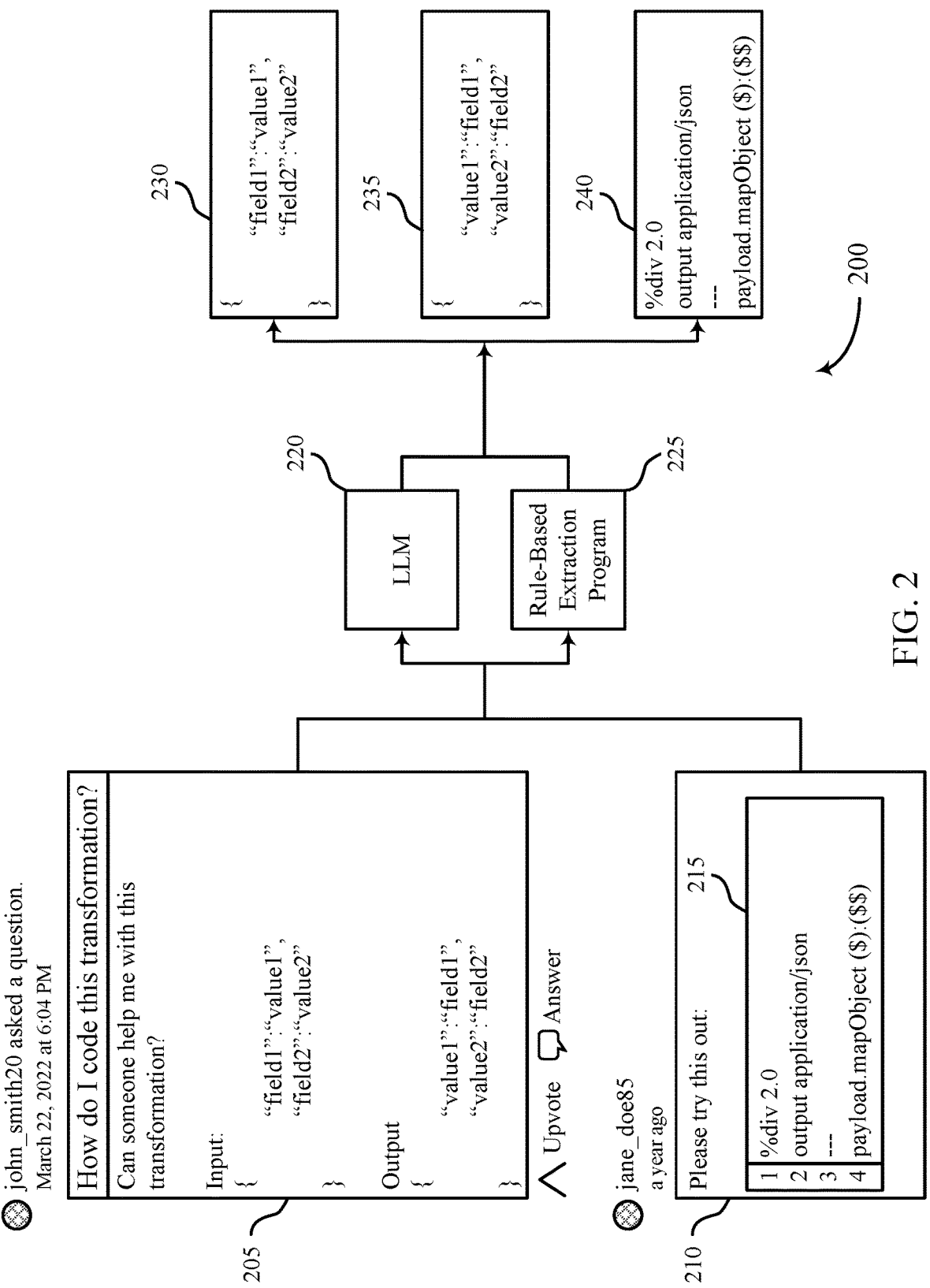
FIG. 2 shows an example of a data extraction system that supports automated data extraction pipeline for LLM training in accordance with aspects of the present disclosure.

FIG. 2 shows an example of a data extraction system 200 that supports automated data extraction pipeline for LLM training in accordance with aspects of the present disclosure. In some examples, the data extraction system 200 may be implemented by the system 100. The data extraction system 200 may include a question portion 205 of a Q&A post, a response portion 210 of the Q&A post which may include a code segment 215, a LLM 220, a rule-based extraction program 225, a predicted input 230, a predicted output 235, and an extracted code segment 240.

In some examples, the data extraction system 200 may extract data (e.g., text data) to train a LLM 220. The LLM 220 may be trained using a corpus of text data scraped from websites on the internet. In some cases, the corpus of text data may be extracted from Q&A forums where users may ask questions (e.g., within a question portion 205 of a Q&A post) and other users may provide answers or responses to the questions (e.g., within a response portion 210 of the Q&A post). As such, the data extraction system 200 may extract a Q&A forum post that may include the question portion 205 and the response portion 210. In some cases, the question portion 205 may include an input payload and expected output payload and the response portion 210 may include a code segment 215 formatted transform the input payload into the expected output provided in the question portion 205 of the Q&A post. The data extraction system 200 may use the LLM 220 to generate a predicted input 230 and a predicted output 235 from a question asked by a user within the question portion 205 of a Q&A forum post using a series of NLP techniques. For example, the LLM 220 may generate the predicted input 230 and predicted output 235 as the input payload and expected output payload within the question portion 205 may be natural language text. That is the LLM 220 may have to identify which portion of the text within the question portion 205 may correspond with the input payload and with the expected output payload. As such, the LLM 220 may generate the predicted input 230 and predicted output 235 accordingly to be used by the data extraction system 100.

To generate the predicted input 230 and predicted output 235 the LLM 220 may look for keywords such as "input" and "output" to identify the input payload and expected output from the question portion 205 of the Q&A post. However, in some cases, the question portion 205 may include a question phrased in a natural language format. For example, the question portion 205 may include a question that says "can someone help me with this transformation?" and a corresponding input payload and expected output payload may also be included in the question portion. In such example, the transformation may be a transformation that takes swaps the key and value for a map object within a computer programming language. A map may be a data structure where each element or object includes data (e.g., values) that are assigned unique keys. In the question portion 205, the input payload may be identified using the keyword "Input" and the expected output payload may be identified using the keyword "Output" followed by the corresponding input and expected output being with a set of brackets. In the illustrated example, the input may include a first map object (e.g., the key being "field1" and the value being "value1") and a second map object (e.g., the key being "field2" and the value being "value2") and the output may be such that the values of the first map object and the second map object are transformed to become the keys and the keys of the first map object and the second map object are transformed to become the values.

To detect such keywords identifying the input pay load and the expected output the data extraction system 200 may use the LLM 220. In some cases, the LLM 220 may be pre-trained with a set of natural language questions and identified inputs and expected outputs (e.g., input and expected output data with corresponding labels). In other cases, the LLM 220 may be trained by extracting question portions 205 from Q&A posts and identify the corresponding input and expected output of the corresponding question portion 205. A user (e.g., a data scientist, software engineer, data administrator) may then categorize the attempts and after a quantity of iterations and the LLM 220 may begin to learn the patterns of the natural language questions asked by users within the question portions 205 of Q&A posts. Additionally, or alternatively, the training of the LLM 220 may contain no user input and may be unsupervised. That is, the LLM 220 may be trained by extracting Q&A posts and learning based on a simple set of rules or guidelines given to the LLM 220 initially.

In addition, the data extraction system 200 may also extract the code segment 215 from the response portion 210 of a Q&A post to transform the predicted input into the predicted output provided in the question portion 205 of the Q&A post using the rule-based extraction program 225. In some examples, the rule-based extraction program 225 may be designed to extract code segments 215 from response portions 210 of Q&A posts using a programming language library designed for scraping information from webpages (e.g., Q&A forums). A programming language library may include pre-written code designed to aid in optimizing tasks for a computer programming language. The pre-written code may further include methods or functions that may be called on by a computer program (e.g., the rule-based extraction program 225) using the programming language library. As such, the rule-based extraction program may use a programming language library that may provide methods and functions to search and iterate through webpages.

Using the programming language library, the rule-based extraction program 225 may extract code segments 215 from the response portion 210 of a Q&A post based on a set of rules. For example, one of the rules may be that the code segment 215 may be extracted from within a set of code tags of the response portion 210. In some examples, when a code segment 215 is included within the response portion 210 of a Q&A post, the code segment 215 may be placed with a set of code tags. For example, within hypertext markup language (HTML) webpages, a code tag may include a starting tag (e.g., <code>) and an ending tag (e.g., </code>) to represent where the code segment 215 begins and ends. The code tags may be used to display the code segment 215 within a web browser in such a way that the formatting of the code remains unchanged such that users can see the correct formatting of the code segment 215. As such, rule-based extraction program 225 may be designed to search for code tags within the response portion 210 of the Q&A post and extract the code segment 215 from the code tags.

In some examples, the LLM 220 may be used to extract the code segment 215 from a response portion 210 of a Q&A post. Further, the code segment 215 may be a complete code segment 215 or a partial code segment 215. For example, when the code segment 215 is a partial code segment 215, the code segment 215 may refrain from including a set of headers for the code segment 215 to be compiled correctly. In such cases, the LLM 220 may be trained with the syntax and documentation of computer programming languages. As such, the LLM 220 may be capable of identifying the computer programming language of the code segment 215 and the LLM 220 may add the headers for the code segment to be compiled correctly. When the code segment 215 is a complete code segment 215, the code segment 215 may include the correct headers to enable the code segment 215 to be compiled if the syntax of the code segment 215 is correct and if the code segment 215 is free from errors.

Following the LLM 220 generating the predicted input 230 and the predicted output 235 from the question portion 205 of the Q&A post and the code segment 215 being extracted from the response portion 210 (e.g., the extracted code segment 240), the data extraction system may convert the extracted code segment 240 into a functioning code segment. In some cases, the data extraction system 200, the LLM 220, or both may transform the extracted code segment 240 into a functioning code segment by performing some text manipulation. For example, the extracted code segment 240 may be a string of text and the data extraction system 200 may convert the string of text into a functioning code segment. In some examples, a programming language may have a built-in function to execute a string of code (e.g., the code segment 215) or the data extraction system 200 may use a separate computer program to transform the extracted code segment 240 into the functioning code segment.

The data extraction system 200 may execute the extracted code segment 240 using the predicted input 230 when compiling the extracted code segment 240 to generate an actual output. The actual output may be compared to the predicted output 235 to determine if the extracted code segment 240 accurately generated the predicted output 235. Further description of such comparison and of the data extraction pipeline may be described elsewhere herein including with reference to FIG. 3

Figure 3:
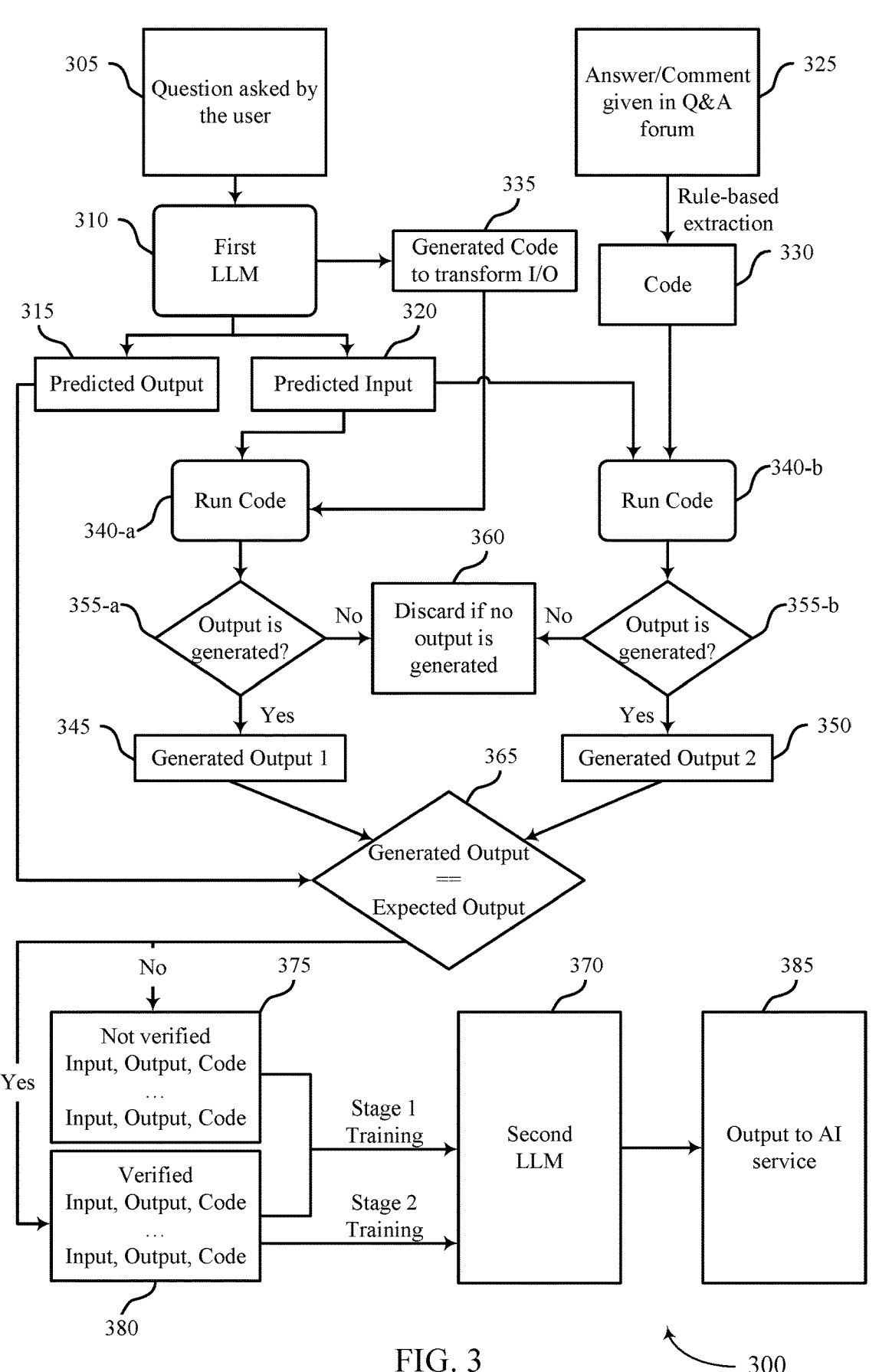
FIG. 3 shows an example of a flow chart that supports automated data extraction pipeline for LLM training in accordance with aspects of the present disclosure.

FIG. 3 shows an example of a data extraction pipeline 300 that supports automated data extraction pipeline for LLM training in accordance with aspects of the present disclosure. In some examples, the data extraction pipeline 300 may be implemented by the system 100. Additionally, or alternatively, the data extraction pipeline 300 may implement the data extraction system 200. In the following description of the data extraction pipeline 300, the operations may be performed in different orders or at different times. Some operations may also be left out of the data extraction pipeline 300, or other operations may be added. Although the data extraction pipeline 300 may be described as being performed by a LLM training service, some aspects of some operations may also be performed by other devices, services, or models described elsewhere herein including with reference to FIG. 1.

The data extraction pipeline 300 may be designed to process unclean text data (e.g., data that may have spelling or grammar mistakes or may be inaccurate) and unlabeled text data (e.g., text data without any meaningful or identifying tags or labels). To process such data, the LLM training service may execute the data extraction pipeline 300 and extract data from Q&A forum posts including extracting input and output data from question portions of Q&A posts. In addition, the data extraction pipeline 300 may extract code segments formatted to transform the extracted input into the extracted output from response portions of Q&A posts. Additionally, or alternatively, the data extraction pipeline 300 may also support the generation of code segments to transform the extracted input into the extracted output. For example, the data extraction pipeline 300 may support techniques of the generation of code for a data transformation language that may be used for transforming an input payload into an output payload.

In a first step of the data extraction pipeline 300, the LLM training service may identify a question 305 from a Q&A forum post. The question may contain uncleaned and unlabeled text data that may include an input and an output. For example, the text data within the question 305 may be one long string of text. The text data of the question 305 may then be used as input for a first LLM 310 to generate a predicted output 315 from a question portion of a first natural language Q&A combination of a set of natural language Q&A combinations (e.g., a first Q&A post from a set of Q&A posts). In some examples, the first LLM 310 may also generate a predicted input 320 from the question portion of the first natural language Q&A combination of the set of natural language Q&A combinations.

In some examples, the first LLM 310 may be a generative pre-trained transformer (GPT) model. A GPT model may be an AI LLM and have the framework for generative AI techniques (e.g., generating text, images, or other media from natural language prompts). The GPT model may be pre-trained on large sets of unlabeled text data and may be capable of identifying or generating content from text data similar to how a human user would identify and generate content from unlabeled text data. Additionally, or alternatively, the first LLM 310 may include a publicly-hosted GPT model. As such, the LLM training service may generate, using the first LLM 310, the predicted output 315 and the predicted output 315 using techniques described elsewhere herein including with reference to FIG. 2.

Further, in another step of the data extraction pipeline 300, the LLM training service may identify a set of responses 325 to the question 305 from the Q&A forum post. For each one of the responses 325, the LLM training service may extract a provided code segment (e.g., a first extracted code segment 330) formatted to transform the predicted input 320) into the predicted output 315. As such, the data extraction pipeline 300 may support extracting a set of code segments from the set of natural language Q&A combinations (e.g., Q&A posts including a question 305 and a response 325) where each Q&A may include a provided input, a provided output, and a provided code segment formatted to transform the provided input into the provided output. For example, the LLM training service may extract a first extracted code segment 330) from a response portion of the first natural language Q&A combination of the set of natural language Q&A combinations.

In some examples, the first Q&A post may not contain a response 325 (e.g., there are no answers to the question 305 within the Q&A post). In such cases, the first LLM 310 may generate a first predicted code segment 335 from the question 305 portion of the first natural language Q&A combination. The first predicted code segment 335 may also be formatted by the first LLM 310 to transform the provided input into the provided output included in the question 305. Additionally, or alternatively, the question 305 may be inputted into the first LLM 310 as a natural language query from a user opposed to being extracted from a Q&A post. As such, the first LLM 310 may generate the first predicted code segment 335 based on the natural language query that includes the question 305. Further, the first LLM 310 may also generate the predicted output, the predicted input 320, or both based on the question 305 from the natural language query.

Following extracting the first code segment and having the first LLM 310 generate the first predicted code segment 335, the data extraction pipeline may initiate an execution step 340 (e.g., an execution step 340-a and an execution step 340-b). In some cases, the execution steps 340, may include executing the first extracted code segment 330, the first predicted code segment 335, or both, within a command line interface via a command line command (e.g., run). As such, at the execution step 340-a, the first predicted code segment 335 may be executed to generate a first actual output 345 of the first predicted code segment 335. At the execution step 340-b, the first extracted code segment 330 may be executed from the extracted set of code segments to generate a first actual output 350 of the first extracted code segment 330. In some examples, the execution step 340-a and the execution step 340-*b* may include inputting the predicted input 320 into the first extracted code segment 330 or the first predicted code segment 335 respectively.

In some cases, the first extracted code segment 330 or the first predicted code segment 335 may fail to generate an output, which may be checked at an output verification step 355. For example, at an output verification step 355-*a*, the LLM training service may determine if the first predicted code segment 335 generated the first actual output 345 of the first predicted code segment 335 at the execution step 340-*a*. Further, at an output verification step 355-*b*, the LLM training service may determine if the first extracted code segment 330) generated the first actual output 350 of the first extracted code segment 330 at the execution step 340-*b*. In some examples, the output verification steps 355 may provide a result indicating whether the respective execution step 340 generated an output. For example, the result may be a binary result within a single bit where a 0 may indicate an output being generated and a 1 may indicate a failure of an output being generated, or vice versa. Additionally, or alternatively, the output verification steps 355 may indicate also if the first extracted code segment 330) or if the first predicted code segment 335 failed to compile (e.g., due to a syntax error, runtime error). In some cases, a command line tool may also be used to verify if the first extracted code segment 330 or the first predicted code segment 335 compiles correctly, if the first extracted code segment 330 or the first predicted code segment 335 produces an output (e.g., the first actual output 350) and the first actual output 345 respectively), or both.

As such, at a code segment discarding step 360, the first predicted code segment 335 may be discarded from a list of candidate training samples if the execution step 340-*a* fails to generate a valid actual output (e.g., the first actual output 345 of the first predicted code segment 335). Further, at the code segment discarding step 360, the first extracted code segment 330) may also be discarded from the list of candidate training samples if the execution step 340-*b* fails to generate a valid actual output (e.g., the first actual output 350 of the first extracted code segment 330). In cases where the output verification step 355-*a* or the output verification step 355-*b* indicate that an output is generated, the first actual output 345 of the first predicted code segment 335 or the first actual output 350 of the first extracted code segment 330 may be compared to the predicted output 315 at a comparison step 365.

At the comparison step 365, the first actual output 345 of the first predicted code segment 335 may be compared to the predicted output 315 and the first actual output 350 of the first extracted code segment 330 may be compared to the predicted output 315. Based on the comparison at the comparison step 365, one or more data samples for training a second LLM 370 may be generated. In some cases, the second LLM 370 may be the same or different from the first LLM 310. Further, the one or more data samples may be tuples that include the predicted input 320, the first extracted code segment 330 or the first predicted code segment 335, and the first actual output 345 of the first predicted code segment 335 of the first actual output 350 of the first extracted code segment 330 respectively. In some examples, the data sample tuples may be within the order described herein or any other order (e.g., {input, output, code}, {input, code, output}, {code, input, output}, {code, output, input}, {output, input, code}, {output, code, input}).

In some cases, the one or more data samples may also include the results of the comparison step 365. For example, an additional bit may be added that is indicative of the results of the comparison step 365, where a 1 may indicate that a positive comparison (e.g., the first actual output 345 or the first actual output 350 is the same as the predicted output 315) and a 0 may indicate a negative comparison (the first actual output 345 or the first actual output 350) is not the same as the predicted output 315), or vice versa. In some examples, the LLM training service may implement one or more programming language libraries to aid in creating a match function to check if the first actual output 345 of the first predicted code segment 335 is the same as the predicted output 315 or if the first actual output 350 of the first extracted code segment 330 is the same as the predicted output 315. In some cases, the one or more programming language libraries may include a first programming language library for determining differences in computer program objects, a second programming language library for generating a difference between two comma-separated values (csv) files, a third programming language library for generating a difference between extensible markup language (XML) files, or any combination thereof.

Further, based on the results of the comparison step 365 (e.g., the comparison of the first actual output 350 of the first extracted code segment 330 to the predicted output 315, the comparison of the first actual output 345 of the first predicted code segment 335 to the predicted output 315, or both), the one or more data samples may be categorized into a first training set 375 or into a second training set 380. As such, the one or more data samples may be used to train or fine-tune the second LLM 370. In some cases, the second LLM 370 may be trained using the first training set 375, the second training set, or both. For example, the first training set 375 may be for data samples that are non-verified (e.g., generate incorrect outputs) and the second training set 380 may be for data samples that are verified (e.g., generate correct outputs). That is, if the comparison at the comparison step 365 indicates that the first actual output 345 of the first predicted code segment 335 or the first actual output 350 of the first extracted code segment 330 is not the same as the predicted output 315, the corresponding one or more data samples may be categorized into the first training set 375. Alternatively, if the comparison at the comparison step 365 indicates that the first actual output 345 of the first predicted code segment 335 or the first actual output 350 of the first extracted code segment 330 is the same as the predicted output 315, the corresponding one or more data samples may be categorized into the second training set 380.

In some examples, in a first training phase (e.g., stage 1 training) the second LLM 370 may be trained using the first training set 375 and the second training set 380. Further, in a second training phase (e.g., stage 2 training), the second LLM 370 may be trained using the second training set 380 alone. That is, for the first training phase all the data samples within the first training set 375 (e.g., non-verified data samples) and the second training set 380 (e.g., verified data samples) may be used for training or fine-tuning the second LLM 370 and for the second training phase only the data samples of the second training set 380 may be used for training or fine-tuning the second LLM 370. Such technique of implementing a two-stage training may enhance the accuracy of the code generated by the second LLM 370. Additionally, or alternatively, after categorizing the one or more data samples into the first training set 375 or the second training set 380, the LLM training service may label the associated data from the respective natural language Q&A combination (e.g., Q&A post) as verified or non-verified.

Moreover, as described herein, the verification process of the extracted code segments (e.g., first extracted code segment 330) and the predicted code segments (e.g., first predicted code segment 335) may include rigorous testing with the predicted input 320 and the predicted output 315 to determine if the predicted output 315 is produced. Further, based on such process, data samples may be labeled as either verified or non-verified which may be used to further in enhance the generation of code using the first LLM 310, the second LLM 370, or both. As such, following all the steps of the data extraction pipeline 300, the second LLM 370 may present the results to an AI service 385. Using the results, the AI service 385 may generate a confidence score for the first LLM 310, the second LLM 370, or both, that is indicative of how accurately the first LLM 310, the second LLM 370, or both can generate code for a user for a computer programming language. In some examples, the confidence score may be a value between zero and one where a value closer to one indicated a higher accuracy of a respective LLMs capability in generating code for a respective computer programming language. In some other examples, as the generation of accurate code may be crucial, the confidence score may be assigned a value of zero or one. A value of one may indicate that the respective LLM may be capable of accurately generating code for a respective computer programming language and a value of zero may indicate that the respective LLM may be incapable of accurately generating code for the respective computer programming language and the respective LLM may should go through additional training.

Additionally, or alternatively, while the data extraction pipeline 300 may present techniques for training a LLM (e.g., the first LLM 310, the second LLM 370, or both) to generate code, the data extraction pipeline 300 may also introduce a technique for autonomously generating code to transform an input into an output by simply providing the corresponding input and the output. For example, as described herein, the data extraction pipeline 300 describes using the input and output from the question 305 from a user to generate the first predicted code segment 335. As such, a user may be able to refrain from providing explicit code descriptions or problem descriptions. Therefore, the data extraction pipeline 300 may provide more efficient and streamlined techniques for having a LLM generate code. Further, the data extraction pipeline may provide techniques to allow any user to use an LLM (e.g., the first LLM 310 or the second LLM 370) to generate code regardless of knowledge or technical experience of LLMs. In some examples, the techniques described herein for the data extraction pipeline 300 may also be performed multiple times for all the extracted code segments of the set of extracted code segments for all the natural language Q&A combinations from the set of natural language Q&A combinations. Further descriptions of the techniques of the present disclosure may be described elsewhere herein, including with reference to FIGS. 4-10.

Figure 4:
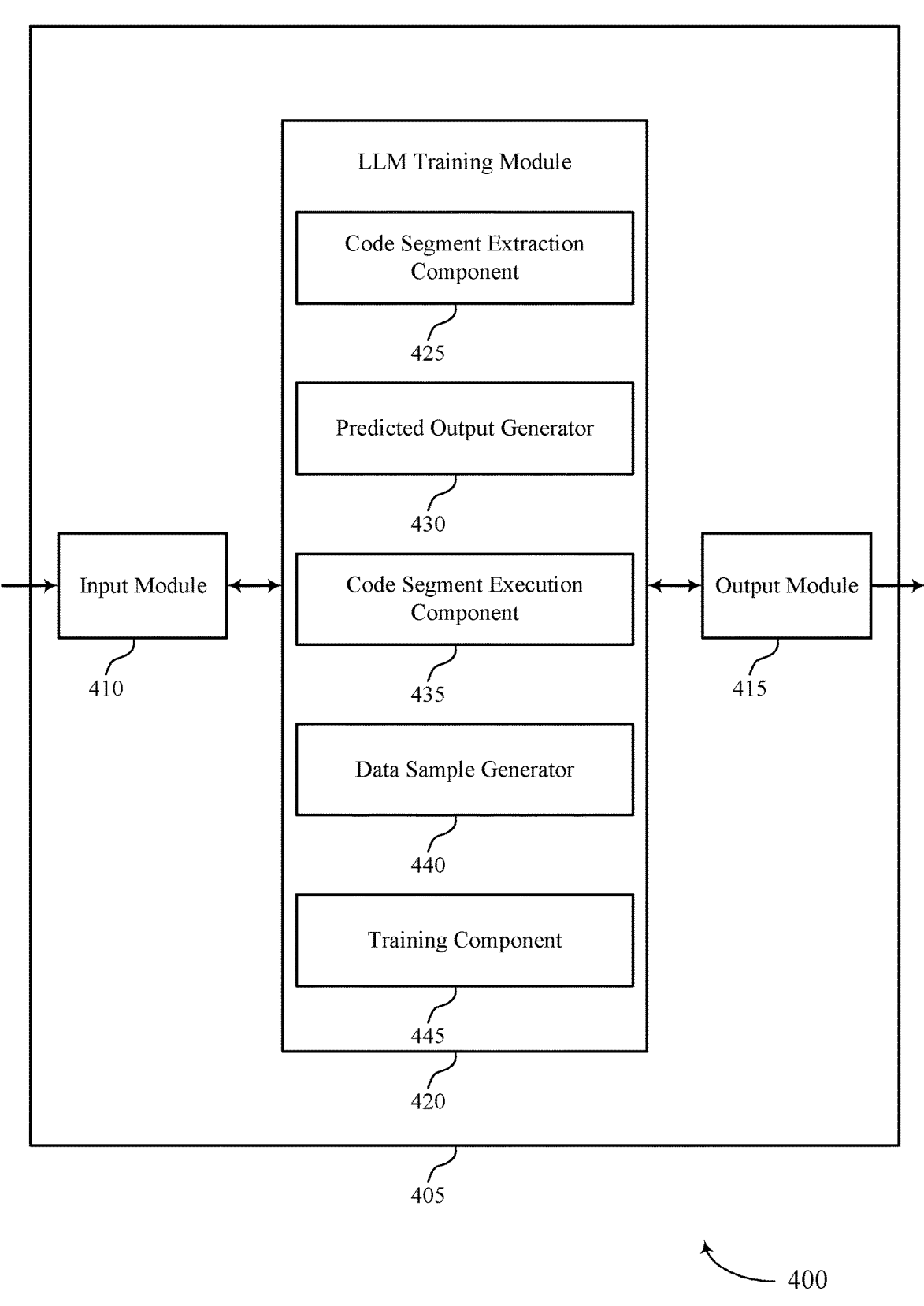
FIG. 4 shows a block diagram of an apparatus that supports automated data extraction pipeline for LLM training in accordance with aspects of the present disclosure.

FIG. 4 shows a block diagram 400 of a device 405 that supports automated data extraction pipeline for LLM training in accordance with aspects of the present disclosure. The device 405 may include an input module 410, an output module 415, and an LLM training module 420. The device 405, or one of more components of the device 405 (e.g., the input module 410, the output module 415, and the LLM training module 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the LLM training module 420 to support automated data extraction pipeline for LLM training. In some cases, the input module 410 may be a component of an I/O controller 610 as described with reference to FIG. 6.

The output module 415 may manage output signals for the device 405. For example, the output module 415 may receive signals from other components of the device 405, such as the LLM training module 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the LLM training module 420 may include a code segment extraction component 425, a predicted output generator 430, a code segment execution component 435, a data sample generator 440, a training component 445, or any combination thereof. In some examples, the LLM training module 420, or various components thereof, may be configured to perform various operations (e.g., receiving, monitoring, transmitting) using or otherwise in cooperation with the input module 410, the output module 415, or both. For example, the LLM training module 420 may receive information from the input module 410, send information to the output module 415, or be integrated in combination with the input module 410, the output module 415, or both to receive information, transmit information, or perform various other operations as described herein.

The LLM training module 420 may support data processing in accordance with examples as disclosed herein. The code segment extraction component 425 may be configured to support extracting a set of multiple code segments from a set of multiple natural language Q&A combinations, where each Q&A combination includes a provided input, a provided output, and a provided code segment formatted to transform the provided input into the provided output. The predicted output generator 430 may be configured to support generating, using a first LLM, a predicted output from a question portion of a first natural language Q&A combination of the set of multiple natural language Q&A combinations. The code segment execution component 435 may be configured to support executing a first extracted code segment from the extracted set of multiple code segments to generate a first actual output of the first extracted code segment. The data sample generator 440) may be configured to support generating one or more data samples for a second LLM based on a comparison of the first actual output of the first extracted code segment to the predicted output from the first LLM. The training component 445 may be configured to support training the second LLM using the one or more data samples.

Figure 5:
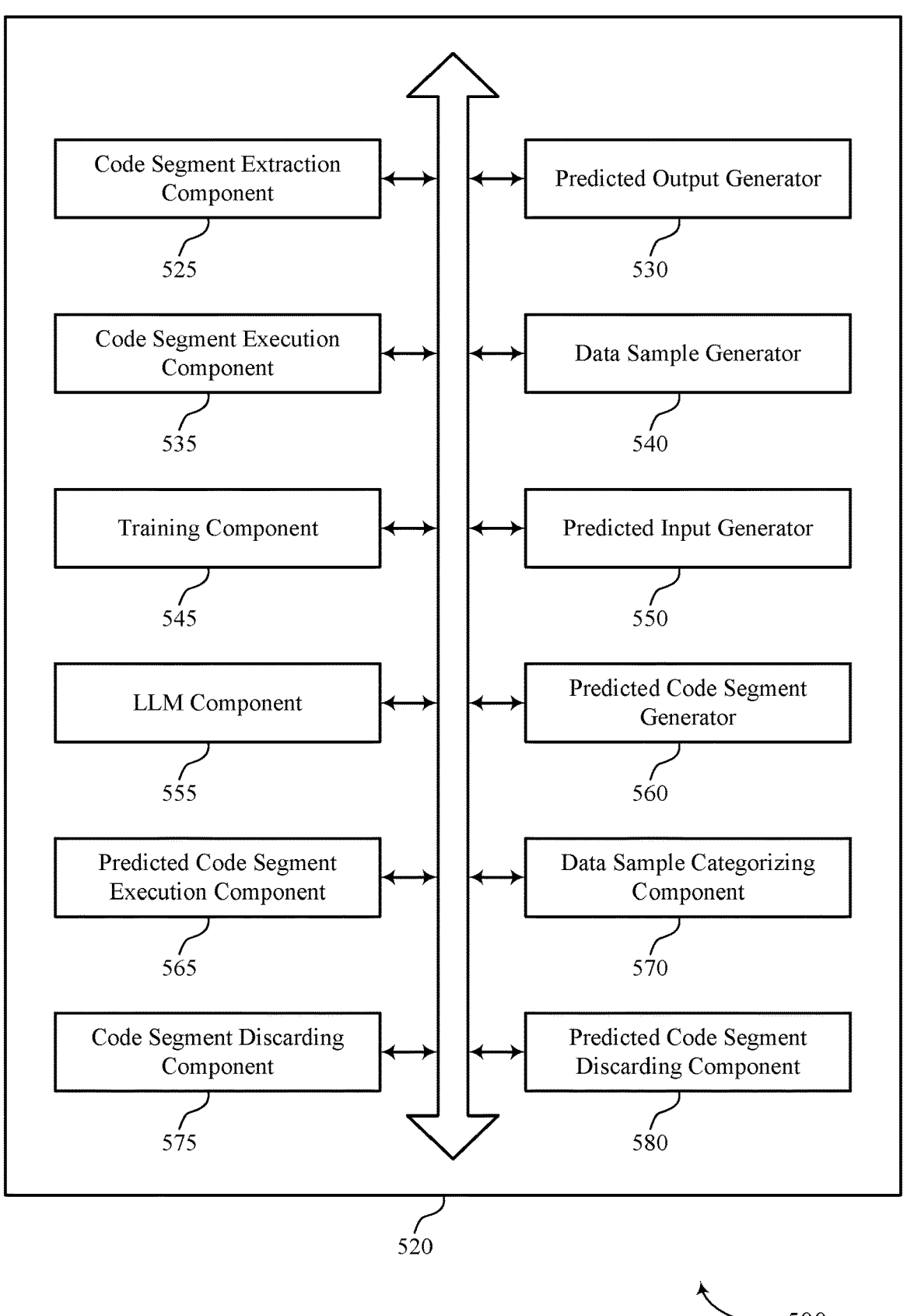
FIG. 5 shows a block diagram of an LLM training module that supports automated data extraction pipeline for LLM training in accordance with aspects of the present disclosure.

FIG. 5 shows a block diagram 500 of an LLM training module 520 that supports automated data extraction pipeline for LLM training in accordance with aspects of the present disclosure. The LLM training module 520 may be an example of aspects of an LLM training module or an LLM training module 420, or both, as described herein. The LLM training module 520, or various components thereof, may be an example of means for performing various aspects of automated data extraction pipeline for LLM training as described herein. For example, the LLM training module 520 may include a code segment extraction component 525, a predicted output generator 530, a code segment execution component 535, a data sample generator 540, a training component 545, a predicted input generator 550, an LLM component 555, a predicted code segment generator 560, a predicted code segment execution component 565, a data sample categorizing component 570, a code segment discarding component 575, a predicted code segment discarding component 580, or any combination thereof. Each of these components, or components of subcomponents thereof (e.g., one or more processors, one or more memories), may communicate, directly or indirectly, with one another (e.g., via one or more buses).

The LLM training module 520 may support data processing in accordance with examples as disclosed herein. The code segment extraction component 525 may be configured to support extracting a set of multiple code segments from a set of multiple natural language Q&A combinations, where each Q&A combination includes a provided input, a provided output, and a provided code segment formatted to transform the provided input into the provided output. The predicted output generator 530 may be configured to support generating, using a first LLM, a predicted output from a question portion of a first natural language Q&A combination of the set of multiple natural language Q&A combinations. The code segment execution component 535 may be configured to support executing a first extracted code segment from the extracted set of multiple code segments to generate a first actual output of the first extracted code segment. The data sample generator 540 may be configured to support generating one or more data samples for a second LLM based on a comparison of the first actual output of the first extracted code segment to the predicted output from the first LLM. The training component 545 may be configured to support training the second LLM using the one or more data samples.

In some examples, the predicted input generator 550 may be configured to support generating, using the first LLM, a predicted input from the question portion of the first natural language Q&A combination, where executing the first extracted code segment includes inputting the predicted input into the first extracted code segment.

In some examples, the predicted code segment generator 560 may be configured to support generating, using the first LLM, a first predicted code segment from the question portion of the first natural language Q&A combination, where the first predicted code segment is formatted by the first LLM to transform the provided input into the provided output. In some examples, the predicted code segment execution component 565 may be configured to support executing the first predicted code segment to generate a first actual output of the first predicted code segment, where generating the one or more data samples for the second LLM is based on comparing the first actual output of the first predicted code segment to the predicted output from the first LLM.

In some examples, executing the first predicted code segment includes inputting the predicted input into the first predicted code segment.

In some examples, the data sample categorizing component 570 may be configured to support categorizing the one or more data samples into a first training set including a first set of multiple data samples or into a second training set including a second set of multiple data samples based on the comparison of the first actual output of the first extracted code segment to the predicted output from the first LLM, or a comparison of the first actual output of the first predicted code segment to the predicted output from the first LLM, or both. In some examples, the training component 545 may be configured to support training the second LLM using the first training set, the second training set, or both.

In some examples, the code segment discarding component 575 may be configured to support discarding the first extracted code segment from a list of candidate training samples if executing the first extracted code segment fails to generate a valid actual output. In some examples, the predicted code segment discarding component 580 may be configured to support discarding the first predicted code segment from the list of candidate training samples if executing the first predicted code segment fails to generate the valid actual output.

In some examples, the first LLM includes a publicly-hosted generative pre-training transformer model.

Figure 6:
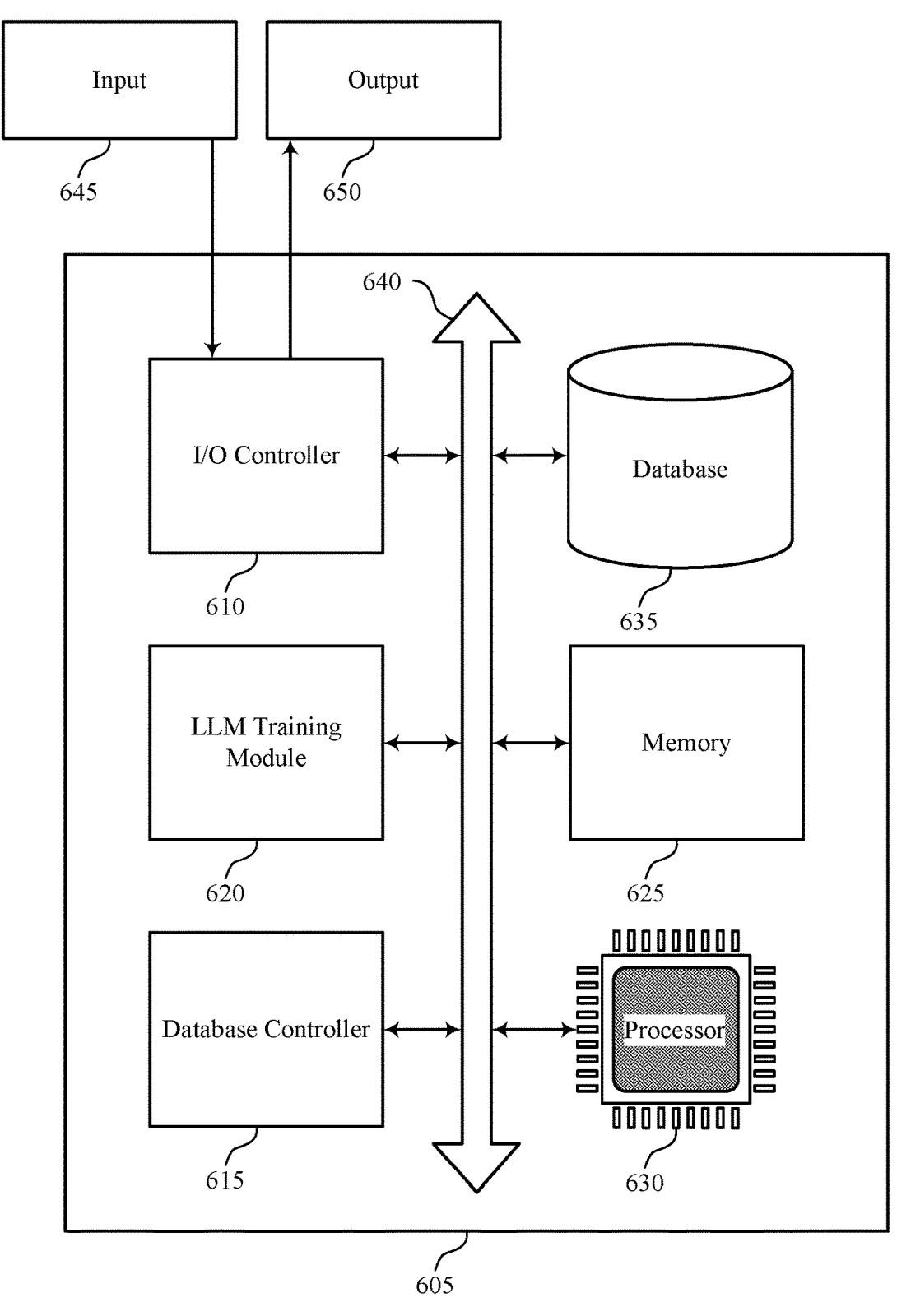
FIG. 6 shows a diagram of a system including a device that supports automated data extraction pipeline for LLM training in accordance with aspects of the present disclosure.

FIG. 6 shows a diagram of a system 600 including a device 605 that supports automated data extraction pipeline for LLM training in accordance with aspects of the present disclosure. The device 605 may be an example of or include the components of a device 405 as described herein. The device 605 may include components for bi-directional data communications including components for transmitting and receiving communications, such as an LLM training module 620, an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause at least one processor 630 to perform various functions described herein. In some cases, the memory 625 may contain, among other things, a BIOS which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting automated data extraction pipeline for LLM training). The processor 630 may be an example of a single processor or multiple processors. For example, the device 605 may include one or more processors 630.

The LLM training module 620 may support data processing in accordance with examples as disclosed herein. For example, the LLM training module 620 may be configured to support extracting a set of multiple code segments from a set of multiple natural language Q&A combinations, where each Q&A combination includes a provided input, a provided output, and a provided code segment formatted to transform the provided input into the provided output. The LLM training module 620 may be configured to support generating, using a first LLM, a predicted output from a question portion of a first natural language Q&A combination of the set of multiple natural language Q&A combinations. The LLM training module 620 may be configured to support executing a first extracted code segment from the extracted set of multiple code segments to generate a first actual output of the first extracted code segment. The LLM training module 620 may be configured to support generating one or more data samples for a second LLM based on a comparison of the first actual output of the first extracted code segment to the predicted output from the first LLM. The LLM training module 620 may be configured to support training the second LLM using the one or more data samples.

By including or configuring the LLM training module 620 in accordance with examples as described herein, the device 605 may support techniques for using an LLM to generate code for an improved reliability in the generated code, increase in accuracy for the generated code, and improved user experience related to the improvements to the generated code.

FIG. 7 shows a flowchart illustrating a method 700 that supports automated data extraction pipeline for LLM training in accordance with aspects of the present disclosure. The operations of the method 700 may be implemented by an LLM training service or its components as described herein. For example, the operations of the method 700 may be performed by an LLM training service as described with reference to FIGS. 1 through 6. In some examples, an LLM training service may execute a set of instructions to control the functional elements of the LLM training service to perform the described functions. Additionally, or alternatively, the LLM training service may perform aspects of the described functions using special-purpose hardware.

At 705, the method may include extracting a set of multiple code segments from a set of multiple natural language Q&A combinations, where each Q&A combination includes a provided input, a provided output, and a provided code segment formatted to transform the provided input into the provided output. The operations of block 705 may be performed in accordance with examples as disclosed herein. In some examples, aspects of the operations of 705 may be performed by a code segment extraction component 525 as described with reference to FIG. 5.

At 710, the method may include generating, using a first LLM, a predicted output from a question portion of a first natural language Q&A combination of the set of multiple natural language Q&A combinations. The operations of block 710 may be performed in accordance with examples as disclosed herein. In some examples, aspects of the operations of 710 may be performed by a predicted output generator 530 as described with reference to FIG. 5.

At 715, the method may include executing a first extracted code segment from the extracted set of multiple code segments to generate a first actual output of the first extracted code segment. The operations of block 715 may be performed in accordance with examples as disclosed herein. In some examples, aspects of the operations of 715 may be performed by a code segment execution component 535 as described with reference to FIG. 5.

At 720, the method may include generating one or more data samples for a second LLM based on a comparison of the first actual output of the first extracted code segment to the predicted output from the first LLM. The operations of block 720 may be performed in accordance with examples as disclosed herein. In some examples, aspects of the operations of 720 may be performed by a data sample generator 540 as described with reference to FIG. 5.

At 725, the method may include training the second LLM using the one or more data samples. The operations of block 725 may be performed in accordance with examples as disclosed herein. In some examples, aspects of the operations of 725 may be performed by a training component 545 as described with reference to FIG. 5.

FIG. 8 shows a flowchart illustrating a method 800 that supports automated data extraction pipeline for LLM training in accordance with aspects of the present disclosure. The operations of the method 800 may be implemented by an LLM training service or its components as described herein. For example, the operations of the method 800 may be performed by an LLM training service as described with reference to FIGS. 1 through 6. In some examples, an LLM training service may execute a set of instructions to control the functional elements of the LLM training service to perform the described functions. Additionally, or alternatively, the LLM training service may perform aspects of the described functions using special-purpose hardware.

At 805, the method may include extracting a set of multiple code segments from a set of multiple natural language Q&A combinations, where each Q&A combination includes a provided input, a provided output, and a provided code segment formatted to transform the provided input into the provided output. The operations of block 805 may be performed in accordance with examples as disclosed herein. In some examples, aspects of the operations of 805 may be performed by a code segment extraction component 525 as described with reference to FIG. 5.

At 810, the method may include generating, using a first LLM, a predicted output from a question portion of a first natural language Q&A combination of the set of multiple natural language Q&A combinations. The operations of block 810 may be performed in accordance with examples as disclosed herein. In some examples, aspects of the operations of 810 may be performed by a predicted output generator 530 as described with reference to FIG. 5.

At 815, the method may include generating, using the first LLM, a predicted input from the question portion of the first natural language Q&A combination, where executing a first extracted code segment includes inputting the predicted input into the first extracted code segment. The operations of block 815 may be performed in accordance with examples as disclosed herein. In some examples, aspects of the operations of 815 may be performed by a predicted input generator 550 as described with reference to FIG. 5.

At 820, the method may include executing the first extracted code segment from the extracted set of multiple code segments to generate a first actual output of the first extracted code segment. The operations of block 820 may be performed in accordance with examples as disclosed herein. In some examples, aspects of the operations of 820 may be performed by a code segment execution component 535 as described with reference to FIG. 5.

At 825, the method may include generating one or more data samples for a second LLM based on a comparison of the first actual output of the first extracted code segment to the predicted output from the first LLM. The operations of block 825 may be performed in accordance with examples as disclosed herein. In some examples, aspects of the operations of 825 may be performed by a data sample generator 540 as described with reference to FIG. 5.

At 830, the method may include training the second LLM using the one or more data samples. The operations of block 830 may be performed in accordance with examples as disclosed herein. In some examples, aspects of the operations of 830 may be performed by a training component 545 as described with reference to FIG. 5.

FIG. 9 shows a flowchart illustrating a method 900 that supports automated data extraction pipeline for LLM training in accordance with aspects of the present disclosure. The operations of the method 900 may be implemented by an LLM training service or its components as described herein. For example, the operations of the method 900 may be performed by an LLM training service as described with reference to FIGS. 1 through 6. In some examples, an LLM training service may execute a set of instructions to control the functional elements of the LLM training service to perform the described functions. Additionally, or alternatively, the LLM training service may perform aspects of the described functions using special-purpose hardware.

At 905, the method may include extracting a set of multiple code segments from a set of multiple natural language Q&A combinations, where each Q&A combination includes a provided input, a provided output, and a provided code segment formatted to transform the provided input into the provided output. The operations of block 905 may be performed in accordance with examples as disclosed herein. In some examples, aspects of the operations of 905 may be performed by a code segment extraction component 525 as described with reference to FIG. 5.

At 910, the method may include generating, using a first LLM, a predicted output from a question portion of a first natural language Q&A combination of the set of multiple natural language Q&A combinations. The operations of block 910 may be performed in accordance with examples as disclosed herein. In some examples, aspects of the operations of 910 may be performed by a predicted output generator 530 as described with reference to FIG. 5.

At 915, the method may include generating, using the first LLM, a first predicted code segment from the question portion of the first natural language Q&A combination, where the first predicted code segment is formatted by the first LLM to transform the provided input into the provided output. The operations of block 915 may be performed in accordance with examples as disclosed herein. In some examples, aspects of the operations of 915 may be performed by a predicted code segment generator 560 as described with reference to FIG. 5.

At 920, the method may include executing the first predicted code segment to generate a first actual output of the first predicted code segment, where generating one or more data samples for a second LLM is based on comparing the first actual output of the first predicted code segment to the predicted output from the first LLM. The operations of block 920 may be performed in accordance with examples as disclosed herein. In some examples, aspects of the operations of 920 may be performed by a predicted code segment execution component 565 as described with reference to FIG. 5.

At 925, the method may include generating the one or more data samples for the second LLM based on a comparison of the first actual output of the first predicted code segment to the predicted output from the first LLM. The operations of block 925 may be performed in accordance with examples as disclosed herein. In some examples, aspects of the operations of 925 may be performed by a data sample generator 540 as described with reference to FIG. 5.

At 930, the method may include training the second LLM using the one or more data samples. The operations of block 930 may be performed in accordance with examples as disclosed herein. In some examples, aspects of the operations of 930 may be performed by a training component 545 as described with reference to FIG. 5.

FIG. 10 shows a flowchart illustrating a method 1000 that supports automated data extraction pipeline for LLM training in accordance with aspects of the present disclosure. The operations of the method 1000 may be implemented by an LLM training service or its components as described herein. For example, the operations of the method 1000 may be performed by an LLM training service as described with reference to FIGS. 1 through 6. In some examples, an LLM training service may execute a set of instructions to control the functional elements of the LLM training service to perform the described functions. Additionally, or alternatively, the LLM training service may perform aspects of the described functions using special-purpose hardware.

At 1005, the method may include extracting a set of multiple code segments from a set of multiple natural language Q&A combinations, where each Q&A combination includes a provided input, a provided output, and a provided code segment formatted to transform the provided input into the provided output. The operations of block 1005 may be performed in accordance with examples as disclosed herein. In some examples, aspects of the operations of 1005 may be performed by a code segment extraction component 525 as described with reference to FIG. 5.

At 1010, the method may include generating, using a first LLM, a predicted output from a question portion of a first natural language Q&A combination of the set of multiple natural language Q&A combinations. The operations of block 1010 may be performed in accordance with examples as disclosed herein. In some examples, aspects of the operations of 1010 may be performed by a predicted output generator 530 as described with reference to FIG. 5.

At 1015, the method may include generating, using the first LLM, a first predicted code segment from the question portion of the first natural language Q&A combination, where the first predicted code segment is formatted by the first LLM to transform the provided input into the provided output. The operations of block 1015 may be performed in accordance with examples as disclosed herein. In some examples, aspects of the operations of 1015 may be performed by a predicted code segment generator 560 as described with reference to FIG. 5.

At 1020, the method may include executing a first extracted code segment from the extracted set of multiple code segments to generate a first actual output of the first extracted code segment. The operations of block 1020 may be performed in accordance with examples as disclosed herein. In some examples, aspects of the operations of 1020 may be performed by a code segment execution component 535 as described with reference to FIG. 5.

At 1025, the method may include executing the first predicted code segment to generate a first actual output of the first predicted code segment, where generating one or more data samples for a second LLM is based on comparing the first actual output of the first predicted code segment to the predicted output from the first LLM. The operations of block 1025 may be performed in accordance with examples as disclosed herein. In some examples, aspects of the operations of 1025 may be performed by a predicted code segment execution component 565 as described with reference to FIG. 5.

At 1030, the method may include generating the one or more data samples for the second LLM based on a comparison of the first actual output of the first extracted code segment to the predicted output from the first LLM, a comparison of the first actual output of the first predicted code segment to the predicted output from the first LLM, or both. The operations of block 1030 may be performed in accordance with examples as disclosed herein. In some examples, aspects of the operations of 1030 may be performed by a data sample generator 540 as described with reference to FIG. 5.

At 1035, the method may include categorizing the one or more data samples into a first training set including a first set of multiple data samples or into a second training set including a second set of multiple data samples based on the comparison of the first actual output of the first extracted code segment to the predicted output from the first LLM, or the comparison of the first actual output of the first predicted code segment to the predicted output from the first LLM, or both. The operations of block 1035 may be performed in accordance with examples as disclosed herein. In some examples, aspects of the operations of 1035 may be performed by a data sample categorizing component 570 as described with reference to FIG. 5.

At 1040, the method may include training the second LLM using the first training set, the second training set, or both. The operations of block 1040 may be performed in accordance with examples as disclosed herein. In some examples, aspects of the operations of 1040 may be performed by a training component 545 as described with reference to FIG. 5.

A method for data processing by an apparatus is described. The method may include extracting a set of multiple code segments from a set of multiple natural language Q&A combinations, where each Q&A combination includes a provided input, a provided output, and a provided code segment formatted to transform the provided input into the provided output, generating, using a first LLM, a predicted output from a question portion of a first natural language Q&A combination of the set of multiple natural language Q&A combinations, executing a first extracted code segment from the extracted set of multiple code segments to generate a first actual output of the first extracted code segment, generating one or more data samples for a second LLM based on a comparison of the first actual output of the first extracted code segment to the predicted output from the first LLM, and training the second LLM using the one or more data samples.

An apparatus for data processing is described. The apparatus may include one or more memories storing processor executable code, and one or more processors coupled with the one or more memories. The one or more processors may individually or collectively operable to execute the code to cause the apparatus to extract a set of multiple code segments from a set of multiple natural language Q&A combinations, where each Q&A combination includes a provided input, a provided output, and a provided code segment formatted to transform the provided input into the provided output, generate, using a first LLM, a predicted output from a question portion of a first natural language Q&A combination of the set of multiple natural language Q&A combinations, execute a first extracted code segment from the extracted set of multiple code segments to generate a first actual output of the first extracted code segment, generate one or more data samples for a second LLM based on a comparison of the first actual output of the first extracted code segment to the predicted output from the first LLM, and train the second LLM using the one or more data samples.

Another apparatus for data processing is described. The apparatus may include means for extracting a set of multiple code segments from a set of multiple natural language Q&A combinations, where each Q&A combination includes a provided input, a provided output, and a provided code segment formatted to transform the provided input into the provided output, means for generating, using a first LLM, a predicted output from a question portion of a first natural language Q&A combination of the set of multiple natural language Q&A combinations, means for executing a first extracted code segment from the extracted set of multiple code segments to generate a first actual output of the first extracted code segment, means for generating one or more data samples for a second LLM based on a comparison of the first actual output of the first extracted code segment to the predicted output from the first LLM, and means for training the second LLM using the one or more data samples.

A non-transitory computer-readable medium storing code for data processing is described. The code may include instructions executable by a processor to extract a set of multiple code segments from a set of multiple natural language Q&A combinations, where each Q&A combination includes a provided input, a provided output, and a provided code segment formatted to transform the provided input into the provided output, generate, using a first LLM, a predicted output from a question portion of a first natural language Q&A combination of the set of multiple natural language Q&A combinations, execute a first extracted code segment from the extracted set of multiple code segments to generate a first actual output of the first extracted code segment, generate one or more data samples for a second LLM based on a comparison of the first actual output of the first extracted code segment to the predicted output from the first LLM, and train the second LLM using the one or more data samples.

Some examples of the method, apparatus, and non-transitory computer-readable medium described herein may further include operations, features, means, or instructions for generating, using the first LLM, a predicted input from the question portion of the first natural language Q&A combination, where executing the first extracted code segment includes inputting the predicted input into the first extracted code segment.

Some examples of the method, apparatus, and non-transitory computer-readable medium described herein may further include operations, features, means, or instructions for generating, using the first LLM, a first predicted code segment from the question portion of the first natural language Q&A combination, where the first predicted code segment may be formatted by the first LLM to transform the provided input into the provided output and executing the first predicted code segment to generate a first actual output of the first predicted code segment, where generating the one or more data samples for the second LLM may be based on comparing the first actual output of the first predicted code segment to the predicted output from the first LLM.

Some examples of the method, apparatus, and non-transitory computer-readable medium described herein may further include operations, features, means, or instructions for executing the first predicted code segment includes inputting the predicted input into the first predicted code segment.

Some examples of the method, apparatus, and non-transitory computer-readable medium described herein may further include operations, features, means, or instructions for categorizing the one or more data samples into a first training set including a first set of multiple data samples or into a second training set including a second set of multiple data samples based on the comparison of the first actual output of the first extracted code segment to the predicted output from the first LLM, or a comparison of the first actual output of the first predicted code segment to the predicted output from the first LLM, or both and training the second LLM using the first training set, the second training set, or both.

Some examples of the method, apparatus, and non-transitory computer-readable medium described herein may further include operations, features, means, or instructions for discarding the first extracted code segment from a list of candidate training samples if executing the first extracted code segment fails to generate a valid actual output and discarding the first predicted code segment from the list of candidate training samples if executing the first predicted code segment fails to generate the valid actual output.

In some examples of the method, apparatus, and non-transitory computer-readable medium described herein, the first LLM includes a publicly-hosted generative pre-training transformer model.

The following provides an overview of aspects of the present disclosure:

Aspect 1: A method for data processing, comprising: extracting a plurality of code segments from a plurality of natural language Q&A combinations, wherein each Q&A combination comprises a provided input, a provided output, and a provided code segment formatted to transform the provided input into the provided output: generating, using a first LLM, a predicted output from a question portion of a first natural language Q&A combination of the plurality of natural language Q&A combinations: executing a first extracted code segment from the extracted plurality of code segments to generate a first actual output of the first extracted code segment: generating one or more data samples for a second LLM based at least in part on a comparison of the first actual output of the first extracted code segment to the predicted output from the first LLM; and training the second LLM using the one or more data samples.

Aspect 2: The method of aspect 1, further comprising: generating, using the first LLM, a predicted input from the question portion of the first natural language Q&A combination, wherein executing the first extracted code segment comprises inputting the predicted input into the first extracted code segment.

Aspect 3: The method of aspect 2, further comprising: generating, using the first LLM, a first predicted code segment from the question portion of the first natural language Q&A combination, wherein the first predicted code segment is formatted by the first LLM to transform the provided input into the provided output; and executing the first predicted code segment to generate a first actual output of the first predicted code segment, wherein generating the one or more data samples for the second LLM is based at least in part on comparing the first actual output of the first predicted code segment to the predicted output from the first LLM.

Aspect 4: The method of aspect 3, wherein executing the first predicted code segment comprises inputting the predicted input into the first predicted code segment.

Aspect 5: The method of any of aspects 3 through 4, further comprising: categorizing the one or more data samples into a first training set comprising a first plurality of data samples or into a second training set comprising a second plurality of data samples based at least in part on the comparison of the first actual output of the first extracted code segment to the predicted output from the first LLM, or a comparison of the first actual output of the first predicted code segment to the predicted output from the first LLM, or both; and training the second LLM using the first training set, the second training set, or both.

Aspect 6: The method of any of aspects 3 through 5, further comprising: discarding the first extracted code segment from a list of candidate training samples if executing the first extracted code segment fails to generate a valid actual output; and discarding the first predicted code segment from the list of candidate training samples if executing the first predicted code segment fails to generate the valid actual output.

Aspect 7: The method of any of aspects 1 through 6, wherein the first LLM comprises a publicly-hosted generative pre-training transformer model.

Aspect 8: An apparatus for data processing, comprising one or more memories storing processor-executable code, and one or more processors coupled with the one or more memories and individually or collectively operable to execute the code to cause the apparatus to perform a method of any of aspects 1 through 7.

Aspect 9: An apparatus for data processing, comprising at least one means for performing a method of any of aspects 1 through 7.

Aspect 10: A non-transitory computer-readable medium storing code for data processing, the code comprising instructions executable by a processor to perform a method of any of aspects 1 through 7.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

extracting a plurality of code segments from a plurality of natural language question-answer combinations, wherein each question-answer combination comprises a provided input, a provided output, and a provided code segment formatted to transform the provided input into the provided output;

generating, using a first large language model, a predicted output from a question portion of a first natural language question-answer combination of the plurality of natural language question-answer combinations;

generating, using the first large language model, a first predicted code segment from the question portion of the first natural language question-answer combination, wherein the first predicted code segment is formatted by the first large language model to transform the provided input, of the first natural language question-answer combination, into the provided output of the first natural language question-answer combination;

executing the first predicted code segment to generate a first actual output of the first predicted code segment;

executing a first extracted code segment from the extracted plurality of code segments to generate a first actual output of the first extracted code segment, the first extracted code segment being from a response portion of the first natural language question-answer combination;

generating one or more data samples for a second large language model based at least in part on a comparison of the first actual output of the first extracted code segment to the predicted output from the first large language model and on a comparison of the first actual output of the first predicted code segment to the predicted output from the first large language model; and training the second large language model using the one or more data samples.

2. The method of claim 1, further comprising:

generating, using the first large language model, a predicted input from the question portion of the first natural language question-answer combination, wherein executing the first extracted code segment comprises inputting the predicted input into the first extracted code segment.

3. The method of claim 1, wherein executing the first predicted code segment comprises inputting the predicted input into the first predicted code segment.

4. The method of claim 1, further comprising:

categorizing the one or more data samples into a first training set comprising a first plurality of data samples or into a second training set comprising a second plurality of data samples based at least in part on the comparison of the first actual output of the first extracted code segment to the predicted output from the first large language model, or a comparison of the first actual output of the first predicted code segment to the predicted output from the first large language model, or both; and training the second large language model using the first training set, the second training set, or both.

5. The method of claim 1, further comprising:

discarding the first extracted code segment from a list of candidate training samples if executing the first extracted code segment fails to generate a valid actual output; and discarding the first predicted code segment from the list of candidate training samples if executing the first predicted code segment fails to generate the valid actual output.

6. The method of claim 1, wherein the first large language model comprises a publicly-hosted generative pre-training transformer model.

7. An apparatus for data processing, comprising:

one or more memories storing processor-executable code; and one or more processors coupled with the one or more memories and individually or collectively operable to execute the code to cause the apparatus to:

extract a plurality of code segments from a plurality of natural language question-answer combinations, wherein each question-answer combination comprises a provided input, a provided output, and a provided code segment formatted to transform the provided input into the provided output;

generate, using a first large language model, a predicted output from a question portion of a first natural language question-answer combination of the plurality of natural language question-answer combinations;

generate, using the first large language model, a first predicted code segment from the question portion of the first natural language question-answer combination, wherein the first predicted code segment is formatted by the first large language model to transform the provided input, of the first natural language question-answer combination, into the provided output of the first natural language question-answer combination;

execute the first predicted code segment to generate a first actual output of the first predicted code segment;

execute a first extracted code segment from the extracted plurality of code segments to generate a first actual output of the first extracted code segment, the first extracted code segment being from a response portion of the first natural language question-answer combination;

generate one or more data samples for a second large language model based at least in part on a comparison of the first actual output of the first extracted code segment to the predicted output from the first large language model and on a comparison of the first actual output of the first predicted code segment to the predicted output from the first large language model; and train the second large language model using the one or more data samples.

8. The apparatus of claim 7, wherein the one or more processors are individually or collectively further operable to execute the code to cause the apparatus to:

generate, using the first large language model, a predicted input from the question portion of the first natural language question-answer combination, wherein executing the first extracted code segment comprises inputting the predicted input into the first extracted code segment.

9. The apparatus of claim 7, wherein executing the first predicted code segment comprises inputting the predicted input into the first predicted code segment.

10. The apparatus of claim 7, wherein the one or more processors are individually or collectively further operable to execute the code to cause the apparatus to:

categorize the one or more data samples into a first training set comprising a first plurality of data samples or into a second training set comprising a second plurality of data samples based at least in part on the comparison of the first actual output of the first extracted code segment to the predicted output from the first large language model, or a comparison of the first actual output of the first predicted code segment to the predicted output from the first large language model, or both; and train the second large language model using the first training set, the second training set, or both.

11. The apparatus of claim 7, wherein the one or more processors are individually or collectively further operable to execute the code to cause the apparatus to:

discard the first extracted code segment from a list of candidate training samples if executing the first extracted code segment fails to generate a valid actual output; and discard the first predicted code segment from the list of candidate training samples if executing the first predicted code segment fails to generate the valid actual output.

12. The apparatus of claim 7, wherein the first large language model comprises a publicly-hosted generative pre-training transformer model.

13. A non-transitory computer-readable medium storing code for data processing, the code comprising instructions executable by one or more processors to:

extract a plurality of code segments from a plurality of natural language question-answer combinations, wherein each question-answer combination comprises a provided input, a provided output, and a provided code segment formatted to transform the provided input into the provided output;

generate, using a first large language model, a predicted output from a question portion of a first natural language question-answer combination of the plurality of natural language question-answer combinations;

generate, using the first large language model, a first predicted code segment from the question portion of the first natural language question-answer combination, wherein the first predicted code segment is formatted by the first large language model to transform the provided input, of the first natural language question-answer combination, into the provided output of the first natural language question-answer combination;

execute the first predicted code segment to generate a first actual output of the first predicted code segment;

execute a first extracted code segment from the extracted plurality of code segments to generate a first actual output of the first extracted code segment, the first extracted code segment being from a response portion of the first natural language question-answer combination;

generate one or more data samples for a second large language model based at least in part on a comparison of the first actual output of the first extracted code segment to the predicted output from the first large language model and on a comparison of the first actual output of the first predicted code segment to the predicted output from the first large language model; and train the second large language model using the one or more data samples.

14. The non-transitory computer-readable medium of claim 13, wherein the instructions are further executable by the one or more processors to:

generate, using the first large language model, a predicted input from the question portion of the first natural language question-answer combination, wherein executing the first extracted code segment comprises inputting the predicted input into the first extracted code segment.

15. The non-transitory computer-readable medium of claim 13, wherein executing the first predicted code segment comprises inputting the predicted input into the first predicted code segment.

16. The non-transitory computer-readable medium of claim 13, wherein the instructions are further executable by the one or more processors to:

categorize the one or more data samples into a first training set comprising a first plurality of data samples or into a second training set comprising a second plurality of data samples based at least in part on the comparison of the first actual output of the first extracted code segment to the predicted output from the first large language model, or a comparison of the first actual output of the first predicted code segment to the predicted output from the first large language model, or both; and train the second large language model using the first training set, the second training set, or both.

17. The non-transitory computer-readable medium of claim 13, wherein the instructions are further executable by the one or more processors to:

discard the first extracted code segment from a list of candidate training samples if executing the first extracted code segment fails to generate a valid actual output; and discard the first predicted code segment from the list of candidate training samples if executing the first predicted code segment fails to generate the valid actual output.

* * * * *